United States Patent Office 3,573,277
Patented Mar. 30, 1971

3,573,277
CELLULOSIC ION EXCHANGE MATERIALS AND METHOD OF MAKING
Roy Arthur Grant, Great Shelford, Cambridge, England, assignor to Tasman Vaccine Laboratory Limited, Upper Hutt, North Island, New Zealand
No Drawing. Filed July 8, 1969, Ser. No. 840,044
Claims priority, application New Zealand, July 15, 1968, 153,128
Int. Cl. C08b *15/00, 15/06*
U.S. Cl. 260—231   15 Claims

ABSTRACT OF THE DISCLOSURE

Ion exchange materials are described which are suitable for separating materials such as proteins and for purifying aqueous effluents. These exchange materials are prepared from regenerated cellulose by cross-linking and introduction of exchange groups to give cationic or anionic exchangers.

BACKGROUND OF THE INVENTION

In general an ion exchange resin consists of an inert insoluble substrate or matrix into which are introduced ionizable chemical groups. Such active chemical groups may be either basic or acidic in nature and capable of binding anions or cations respectively by a process analogous to salt formation. Such bound ions may be exchanged for different ions when the chemical environment of the resin is changed, e.g. in the process of water softening sodium ions are exchanged for calcium and magnesium ions.

Chemical substrates useful for preparing ion exchange materials can be prepared from the condensation of phenols with formaldehyde or the polymerisation of monomers such as styrene, divinylbenzene or methacrylic acid. One requisite of such a substrate is that it should be relatively easy to introduce active chemical groups into the structure, but this requisite is not always met by such substrates as have been prepared in the past.

Cellulose is a naturally occurring substrate which is insoluble in water and which can be easily chemically modified to incorporate ionizable groups. However, cellulose has a fibrous structure and hence ion exchange materials based on cellulose usually suffer from the disadvantage of poor hydraulic properties and generally have low flow rates and tend to become easily clogged by particles of suspended matter. Consequently ion exchange materials based on fibrous cellulose have very restricted application whereas the synthetic ion exchange resins are usually produced in granual or bead form having good hydraulic properties and hence very broad fields of application, but as stated the introduction of active chemical groups is not always easy to carry out.

On the other hand, although it has also been proposed to use certain types of regenerated cellulose as ion-exchange materials, and regenerated cellulose is obtainable in granular form, it is found that, if the number of ionisable groups attached to the cellulose exceeds a certain level, then the resultant material becomes soluble in dilute acid and alkali. As ion-exchange purification often involves regeneration with acidic or alkaline media this is highly inconvenient.

SUMMARY OF THE INVENTION

According to this invention we provide a method of making an ion-exchanger comprising the introduction of cross-linking residues into regenerated cellulose together with or followed by the introduction of groups capable of anion or cation exchange into the cellulose, the cross-linking being carried out in the reaction medium free from components which would, if present, react readily with the cross-linking residues to give terminal groups.

DESCRIPTION OF PREFERRED EMBODIMENTS

The regenerated cellulose may be, for example, viscose and may be in a variety of forms such as rod, filament, yarn, woven cloth, flakes, beads, granules, powder, sponge, tube or sheet. The cellulose may contain softeners or plasticisers such as glycerol, urea or triethylene glycol and may contain a preservative such as phenol.

The cross-linking of the regenerated cellulose may be carried out chemically, by the use of any bifunctional chemical compound capable of reacting with two hydroxyl groups to form covalent bonds such as by the treatment of cellulose with aldehyde under acidic conditions. Suitable aldehydes are formaldehyde, glyoxal, glutaraldehyde and acrolein and the acid may conveniently be hydrochloric acid. Alternatively, the cross-linking may be achieved by treatment of the cellulose with epichlorhydrin under basic conditions. Alternatively, cross-linking may be achieved physically by exposure of the regenerated cellulose to high intensity ionising radiation such as that afforded by ultra-violet light, gamma rays or electron beams, in the presence of water and sensitizing chemicals.

The properties of the cross-linked regenerated cellulose may be further modified by the introduction of non-ionizing chemical groups such as methyl, ethyl, phenyl, or cyclohexyl groups, for example, in order to enhance the hydrophobic properties of the final product.

Preferably, the degree of cross-linking required to confer the necessary properties to the regenerated cellulose may vary between 1 and 10 percent, although occasionally degree of cross-linking outside this range may be required for special reasons. The degree of cross-linking may be expressed in terms of the ratio of the weight of cross-linking agent to the dry weight of the regenerated cellulose.

A great variety of ion exchange groups may be introduced to the regenerated cellulose, either after the cross-linking or at the same time as the cross-linking reaction. As explained above, it is essential that the cross-linking be carried out in a reaction medium free of components which would, if present, react readily with the cross-linking residues to give terminal groups. Thus, the introduction of exchange groups and the cross-linking can only be carried out simultaneously if the exchange groups themselves do not take part in the cross-linking reaction. Groups capable of anion exchange which may be introduced include amino, alkylamino, guanidino, and quaternary ammonium groups. Groups capable of cation exchange which may be introduced include sulphonic acids, phosphate and carboxyl groups.

It has been found that for both the cross-linking reaction and the introduction of the exchanger groups the water content of the reaction mixture should be carefully controlled to give optimum results. In general, the water content preferably lies within the range of 50 to 100 percent of the weight of the regenerated cellulose during the introduction of the exchange groups and depends somewhat on the grain size of the cellulose used.

The invention will now be further illustrated with reference to the following examples. Examples 1 to 5 illustrate various methods of preparation of ion exchangers in accordance with the invention. Example 6 illustrates the advantage of an ion exchanger obtained in accordance with the invention when compared with a regenerated cellulose which has not been cross-linked. Examples 7 and 8 illustrate the use of the ion exchange materials prepared in accordance with the invention in the separation of protein-containing materials.

EXAMPLE 1

Ground dried regenerated cellulose tubing (obtained from the Viscose Development Company Limited, South Dock, Swansea) was subjected to further grinding in a Christy and Norris laboratory mill to produce a fraction in the size range 30–50 mesh by sieving. 200 grams of this fraction were placed in 1 litre of 10 percent (w./v.) formaldehyde containing 2 percent (w./v.) hydrochloric acid for 48 hours at room temperature. The crosslinked viscose so obtained was separated from the solution and thoroughly washed with cold tap water, and finally dried in a hot air oven at 100° C.

The dry cross-linked viscose was then mixed with monochloracetic acid (30 grams) in 30 percent (w./v.) sodium hydroxide (145 ml.). After thorough incorporation of the reagents into the viscose, the mixture, which appeared fairly dry at this stage, was placed in a screw cap jar and lightly tamped down. The lid was placed on the jar and the jar allowed to stand for 30 minutes and then placed in a water bath so that the water, covered the jar up to the level of the mixture. The water was brought to the boil and allowed to boil for exactly 1 hour. The jar was removed, cooled and the contents (now of a brownish colour) tipped into 5 litres of cold 1 N sulphuric acid with thorough stirring. The resultant ion exchange material was filtered on a large Buchner funnel and washed with deionized water until the washings were neutral. The ion exchange material was air dried and the final product (H form) had an exchange capacity of approximately 0.9 milliequivalent per gram.

EXAMPLE 2

Monofilament viscose, (25,000 denier gauge, obtained from Lustre Fibres Limited, of Coventry) was finely ground in a Christy and Norris Laboratory mill to produce a fraction of 100–150 standard mesh size. 200 grams of this fraction were thoroughly mixed with 30 percent sodium hydroxide solution (200 ml.) to which diethylaminoethyl chloride hydrochloride (66 grams) and epichlorhydrin (5 ml.) had been added. The mixing was done under a hood filter with an extractor fan. The mixture, which appeared dry, was placed in a screw topped jar and lightly compressed, the lid placed on the jar and the jar allowed to stand for 30 minutes. The jar was placed in a boiling water bath for 1 hour and then allowed to cool. The contents were tipped into 5 litres of cold water, stirred, allowed to settle and the brown supernatant removed by decantation. The process was repeated till the supernatant was approximately neutral. The ion exchange material was collected by filtration and air dried. The dry material had an exchange capacity calculated from uptake of hydrochloric acid of 0.9 milliequivalent per gram.

EXAMPLE 3

Ground dried regenerated cellulose tubing (18 to 30 mesh size, obtained from The Viscose Development Company Limited, South Dock, Swansea) (200 grams) was mixed with 30 percent (w./v.) sodium hydroxide (144 ml.) which had been previously mixed with monochloracetic acid (30 grams) and epichlorohydrin (5 ml.). The final mixture, which appeared almost dry, was placed in a screw cap jar and lightly compressed, after which the lid was placed on the jar and the jar allowed to stand for 30 minutes before being placed in boiling water bath for 1 hour. After cooling, the contents were tipped into 5 litres of cold 1 N sulphuric acid. The resultant ion exchange material was washed several times by decantation and resuspension in water until the supernatant solution was neutral. The product was then collected by filtration and air dried. The dry material had an exchange capacity calculated from titration with 0.1 N sodium hydroxide solution using a pH meter of 0.8 milliequivalent per gram.

EXAMPLE 4

Ground viscose monofilament (obtained from Lustre Fibres Limited, Coventry) and of 18–30 mesh size range (240 grams) was placed in 1 litre of 10 percent (w./v.) formaldehyde solution containing 2 percent (w./v.) hydrochloric acid. The mixture was allowed to stand at room temperature for 48 hours, after which the crosslinked viscose was collected by filtration, washed with water and dried in a hot air oven at 100° C.

The dry cross-linked viscose was then mixed with 30 percent (w./v.) sodium hydroxide solution (145 ml.) previously mixed with diethylaminoethyl chloride hydrochloride (80 grams). The mixture was placed in a screw top jar and allowed to stand for 30 minutes before being heated for 1 hour in a boiling water bath. After cooling, the contents were tipped with vigorous stirring into 5 litres of cold water. After settling, the brown supernatant liquid was removed by decantation and the product washed by resuspension in water and decantation until the supernatent liquid was colourless and neutral. The product was collected by filtration and air dried. The dry product had an exchange capacity calculated from the uptake of hydrochloric acid of 0.9 milliequivalent per gram.

EXAMPLE 5

Regenerated cellulose (100 grams) of 30–50 mesh was sprayed with epichlorhydrin (10 ml.) so that it was evenly coated. 30 percent (w./v.) sodium hydroxide (75 ml.) was added and thoroughly mixed in. After standing for 30 minutes, the mixture was heated for 1 hour at 100° C. in a stoppered container. The cross-linked viscose obtained was washed with water and dried.

The product (25 grams) was mixed with 85 percent orthtophosphoric acid (11 ml.) and urea (32 grams) dissolved in water (32 ml.). The mixture was heated at 140° C. for 5 hours. The dry product after isolation had an exchange capacity (based on the splitting of 5 percent sodium chloride solution) of 2.7 milliequivalents per gram.

EXAMPLE 6

Regenerated cellulose (20 grams) of 30–50 mesh size was converted into anion exchange material by treatment with diethylaminoethyl chloride hydrochloride (6 grams) and 30 percent sodium hydroxide (12 ml.) and heated for 1 hour at 100° C. as described in Example 2.

The treatment was repeated with a further quantity of regenerated cellulose except that epichlorhydrin (1.0 ml.) was added to the mixture before heating.

The initial uncross-linked ion exchange material swelled and dissolved in 10 percent sodium hydroxide solution. The cross-linked exchange material had not dissolved in the alkali after 1 week and the grains only showed slight swelling.

EXAMPLE 7

An ion exchange material obtained from the treatment of regenerated cellulose according to Example 2 was made into a slurry with water and opured into a glass tube of 2 cm. in diameter to give a 25 cm. high resin column. The column was equilibrated with phosphate buffer solution pH 8 by first passing through 250 ml. of the buffer at 0.5 M concentration followed by 250 ml. of 0.005 M buffer. The excess buffer was removed from the top of the column and goat serum (0.5 ml.) applied and allowed to soak in. The column was then eluted using a buffer gradient at a pumping rate of 2 ml. per minute with buffer concentration increasing from 0.005 M to 0.25 M. The output from the bottom of the column was monitored with an ultra violet spectrophotometer at 280 mm. The graph showed the separation of the serum into 5 well defined peaks corresponding to serum albumin, and $\alpha_1$, $\alpha_2$, $\beta$ and $\gamma$ globulin.

EXAMPLE 8

A column of the carboxymethyl derivative of crosslinked viscose was used to selectively absorb lysozyme from a mixture of egg white proteins. The column was operated in the sodium form and lysozyme was recovered by elution with 10 percent brine.

The above experiments show the preparation and the use of ion exchange materials with hydraulic properties which enable high flow rates to be obtained with viscous liquids, such as sugar syrups containing high percentages of solids. The hydraulic properties can be varied over a wide range simply by altering the mesh size range of the grains, thus contrasting with the limited applicability of ordinary fibrous cellulose. The resin granules have good physical stability and do not tend to gelatinize in alkali, as is the case with normal cellulose exchangers. The degree of swelling of the resin grains can be readily controlled by varying the degree of cross-linking. The physical nature of the ion exchange resins prepared in accordance with the invention enables them to be used for liquids containing large amounts of suspended particulate matter, such as would be the case for example in purifying effluent from a meat works, which would rapidly clog a bed of fibrous cellulose exchanger and lower the flow rate to an unacceptable level for commercial application. Furthermore, with the granular exchangers of the present invention, it is a straightforward operation to backwash the column and free the resin from tapped particulate matter so that the resin can be roused.

What I claim and desire to secure by Letters Patent is:

1. A method of making an ion exchanger comprising:
   introducing crosslinking residues into regenerated cellulose, and
   introducing ion exchange groups into the regenerated cellulose not earlier than introducing the cross linking residues,
   the crosslinking being carried out in a reaction medium free of components which would, if present, react with the crosslinking residues to give terminal groups.

2. A method of making an ion exchanger according to claim 1 wherein the regenerated cellulose is viscose.

3. A method of making an ion exchanger according to claim 1 wherein the introduced exchange groups are capable of anion exchange and chosen from amino, alkylamino, guanidino, and quaternary ammonium groups.

4. A method of making an ion exchanger according to claim 1 wherein the introduced exchange groups are capable of cation exchange and chosen from sulfonic acid, phosphate and carboxyl groups.

5. A method of making an ion exchanger according to claim 1 comprising treating the regenerated cellulose with an aldehyde under acidic conditions whereby the crosslinking residues are introduced.

6. A method of making an ion exchanger according to claim 5 wherein the aldehyde is formaldehyde and the reaction is conducted in the presence of hydrochloric acid.

7. A method of making an ion exchanger according to claim 1 comprising treating the regenerated cellulose with epichlorhydrin under basic conditions whereby the crosslinking residues are introduced.

8. A method of making an ion exchanger according to claim 7 wherein the base used is sodium hydroxide.

9. A method of making an ion exchanger according to claim 1 wherein the degree of crosslinking is from 1 to 10 percent, based on the ratio of weight of crosslinking agent to the dry weight of the regenerated cellulose.

10. A method of making an ion exchanger according to claim 1 wherein the water content during the introduction of the exchange groups lies within the range of 50 to 100 percent of the weight of regenerated cellulose.

11. An ion exchanger consisting essentially of regenerated cellulose, aldehyde residues crosslinking the cellulose and ion exchange groups attached to the cellulose.

12. An ion exchange according to claim 11 wherein the aldehyde residues are formaldehyde residues.

13. An ion exchanger according to claim 11 wherein the regenerated cellulose is viscose.

14. An ion exchanger according to claim 11 wherein the exchange groups are capable of anion exchange and chosen from amino, alkylamino, quanidino or quaternary ammonium.

15. An ion exchanger according to claim 11 wherein the exchange groups are capable of cation exchange and chosen from sulfonic acid, phosphate or carboxyl groups.

References Cited

UNITED STATES PATENTS

| | | | |
|---|---|---|---|
| 2,759,787 | 8/1956 | Touey et al. | 8—120 |
| 2,926,146 | 2/1960 | McCully | 260—2.2 |
| 3,226,380 | 12/1965 | Knight | 260—212 |
| 3,275,576 | 9/1966 | Flodin et al. | 260—2.2 |
| 3,277,025 | 10/1966 | Flodin et al. | 260—2.1 |
| 3,311,608 | 3/1967 | Murphy | 260—212 |

WILLIAM H. SHORT, Primary Examiner

M. GOLDSTEIN, Assistant Examiner

U.S. Cl. X.R.

260—2.1, 2.2, 112, 112.5, 212, 232